US012597826B2

(12) United States Patent (10) Patent No.: US 12,597,826 B2
Sung (45) Date of Patent: Apr. 7, 2026

(54) ENERGY HARVESTER USING ELECTROMAGNETIC INDUCTION AND ENERGY HARVESTING BLOCK

(71) Applicant: HUJECT CORP., Seoul (KR)

(72) Inventor: Moses Sung, Seoul (KR)

(73) Assignee: HUJECT CORP., Seoul (KR)

( * ) Notice: Subject to any disclaimer, the term of this patent is extended or adjusted under 35 U.S.C. 154(b) by 212 days.

(21) Appl. No.: 18/675,710

(22) Filed: May 28, 2024

(65) Prior Publication Data

US 2024/0333091 A1 Oct. 3, 2024

Related U.S. Application Data

(63) Continuation of application No. PCT/KR2022/014193, filed on Sep. 22, 2022.

(30) Foreign Application Priority Data

| | | |
|---|---|---|
| Dec. 7, 2021 | (KR) | 10-2021-0173432 |
| Jan. 20, 2022 | (KR) | 10-2022-0008388 |
| Jan. 20, 2022 | (KR) | 10-2022-0008389 |

(51) Int. Cl.
*H02K 7/06* (2006.01)
*H02K 7/08* (2006.01)
*H02K 7/116* (2006.01)
*H02K 17/44* (2006.01)

(52) U.S. Cl.
CPC ................. *H02K 7/06* (2013.01); *H02K 7/08* (2013.01); *H02K 7/116* (2013.01); *H02K 17/44* (2013.01)

(58) Field of Classification Search
CPC .......... H04N 5/772; H04N 5/783; H04N 5/85;

H04N 9/8042; A24B 13/02; A24B 15/12; A24B 15/16; A24B 15/165; F16H 49/00; F16C 27/04; F28F 13/003; F28F 21/084;

(Continued)

(56) References Cited

U.S. PATENT DOCUMENTS

| | | | | |
|---|---|---|---|---|
| 12,119,193 | B2 * | 10/2024 | Klausnitzer | H02K 35/04 |
| 2006/0091984 | A1 * | 5/2006 | Schmidt | H02K 35/02 |
| | | | | 335/78 |
| 2014/0091746 | A1 * | 4/2014 | Fujishima | H02K 16/00 |
| | | | | 318/538 |

FOREIGN PATENT DOCUMENTS

| | | | |
|---|---|---|---|
| JP | 2003017199 A | * | 1/2003 |
| JP | 2003-047199 A | | 2/2003 |
| KR | 20-1980-0000445 Y1 | | 4/1980 |

(Continued)

OTHER PUBLICATIONS

JP-2003017199-A, all pages (Year: 2003).*

(Continued)

*Primary Examiner* — Naishadh N Desai

(57) ABSTRACT

An energy harvester using electromagnetic induction includes: a magnet portion; a coil portion including a coil and disposed around the magnet portion, a rotational movement part configured to rotate the magnet portion or the coil portion, a lever configured to rotate the rotational movement part, an external force transmitter that is moved toward the lever by an external force to rotate the lever in a first direction about a rotation shaft of the lever and transmits the external force to different points of the lever according to a magnitude of the external force, and an elastic body configured to rotate the lever in a second direction.

16 Claims, 9 Drawing Sheets

(58) Field of Classification Search
　　　CPC .......... H02K 17/44; H02K 35/02; H02K 7/06;
　　　　　　　　　　H02K 7/08; H02K 7/116; H02K 7/18
　　　See application file for complete search history.

(56)　　　　　　　　References Cited

FOREIGN PATENT DOCUMENTS

| KR | 10-2020-0111971 | A | 10/2020 |
| KR | 10-2317418 | B1 | 10/2021 |

OTHER PUBLICATIONS

International Search Report issued from PCT International Application No. PCT/KR2022/014193 issued on Dec. 19, 2022.
Written Opinion of International Search Authority for PCT International Application No. PCT/KR2022/014193 issued on Dec. 19, 2022.

* cited by examiner

ENERGY HARVESTER USING ELECTROMAGNETIC INDUCTION AND ENERGY HARVESTING BLOCK

CROSS-REFERENCE TO RELATED APPLICATION

This application is a bypass continuation of PCT International Application No. PCT/KR2022/014193, which was filed on Sep. 22, 2022, and which claims priority to and the benefit of Korean Patent Application No. 2022-0008388, filed on Jan. 20, 2022, Korean Patent Application No. 10-2022-0008389, filed with the Korean Intellectual Property Office on Jan. 20, 2022, and Korean Patent Application No. 10-2021-0173432, filed with the Korean Intellectual Property Office on Dec. 7, 2021, the disclosures of which are incorporated herein by reference in its entirety.

BACKGROUND

1. Field of the Invention

The present disclosure relates to an energy harvester using electromagnetic induction and an energy harvesting block, and more specifically, to an energy harvester and an energy harvesting block that generate electrical energy by converting an external force applied in a vertical direction into rotational movement.

2. Discussion of Related Art

Recently, various energy production methods have been researched due to the shortage of energy resources. In particular, research on systems for collecting energy discarded in daily life is being actively conducted under the concept of energy harvesting.

Energy harvesting technology is a technology that collects energy discarded in daily life, such as vibrations, light, heat, and electromagnetic waves, and converts the collected energy into usable electrical energy, and active research is being conducted in a wide variety of fields.

In particular, energy harvesting devices using electromagnetic induction have a simple principle and are easy to implement, and thus they are applied to a variety of products.

SUMMARY OF THE INVENTION

The present disclosure is directed to providing an energy harvester and an energy harvesting block that generate electrical energy by converting vertical movement by an external force into rotational movement.

The present disclosure is also directed to providing an energy harvester and an energy harvesting block with improved durability.

The present disclosure is also directed to providing an energy harvester and an energy harvesting block with improved harvesting efficiency.

According to an aspect of the present disclosure, there is provided an energy harvester using electromagnetic induction, which includes a magnet portion, a coil portion including a coil and disposed around the magnet portion, a rotational movement part configured to rotate the magnet portion or the coil portion, a lever configured to rotate the rotational movement part, an external force transmitter that is moved toward the lever by an external force to rotate the lever in a first direction about a rotation shaft of the lever and transmits the external force to different points of the lever according to a magnitude of the external force, and an elastic body configured to rotate the lever in a second direction.

According to another aspect of the present disclosure, there is provided an energy harvester using electromagnetic induction, which includes a substrate, a magnet portion, a coil portion including a coil and disposed around the magnet portion, a rotational movement part configured to rotate the magnet portion or the coil portion on the substrate and including at least one gear, a lever configured to rotate the rotational movement part, an external force transmitter that is moved toward the lever by an external force to rotate the lever in the first direction around the rotation shaft of the lever, an elastic body configured to rotate the lever in a second direction, and a ball bearing configured to reduce friction between the gear and the substrate or between the magnet portion and the coil portion.

According to still another aspect of the present disclosure, there is provided an energy harvesting block using electromagnetic induction, which includes at least one energy harvester, a housing in which the energy harvester is disposed and of which an upper portion is open, and an upper cover coupled to the upper portion of the housing to seal the housing and elongated in an inner direction of the housing by an external force, wherein an energy harvester includes: a magnet portion, a coil portion including a coil and disposed around the magnet portion, a rotational movement part configured to rotate the magnet portion or the coil portion, a lever configured to rotate the rotational movement part, an external force transmitter that is moved toward the lever by the elongation of the upper cover to rotate the lever in the first direction around the rotation shaft of the lever, and an elastic body configured to rotate the lever in a second direction.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
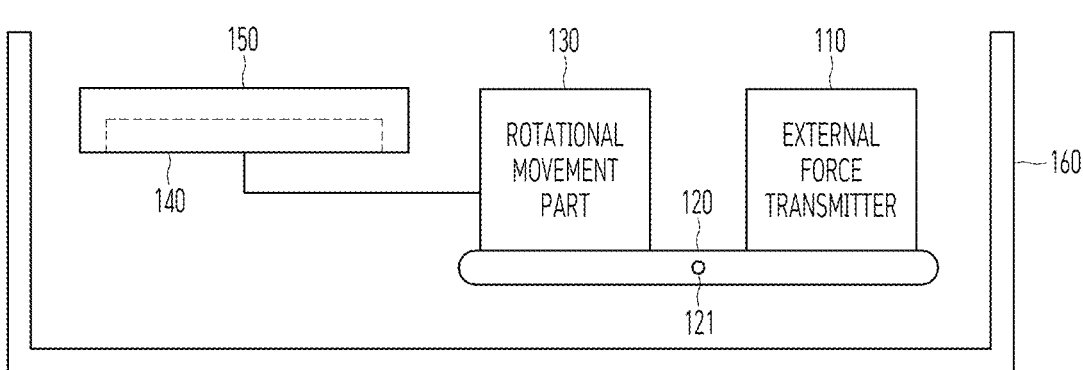
FIG. 1 is a diagram for describing an energy harvester using electromagnetic induction according to one embodiment of the present disclosure.

Since the present disclosure may be modified into various forms and may have a variety of exemplary embodiments, specific embodiments will be illustrated in the drawings and described in detail. The embodiments, however, are not to be taken in a sense which limits the present disclosure to the specific embodiments and should be understood to include modifications, equivalents, or substituents within the spirit and technical scope of the present disclosure. In describing each drawing, similar reference numerals are assigned to similar components.

Hereinafter, exemplary embodiments of the present disclosure will be described in detail with reference to the accompanying drawings.

FIG. 1 is a diagram for describing an energy harvester using electromagnetic induction according to one embodiment of the present disclosure.

The energy harvester according to one embodiment of the present disclosure generates electrical energy by rotating a magnet or a coil using an external force applied from the outside. The external force applied from the outside may change according to a use environment of the energy harvester. For example, when the energy harvester is used in a sidewalk block, the external force may be a pressure due to a weight of a pedestrian walking on the sidewalk block.

Figure 2:
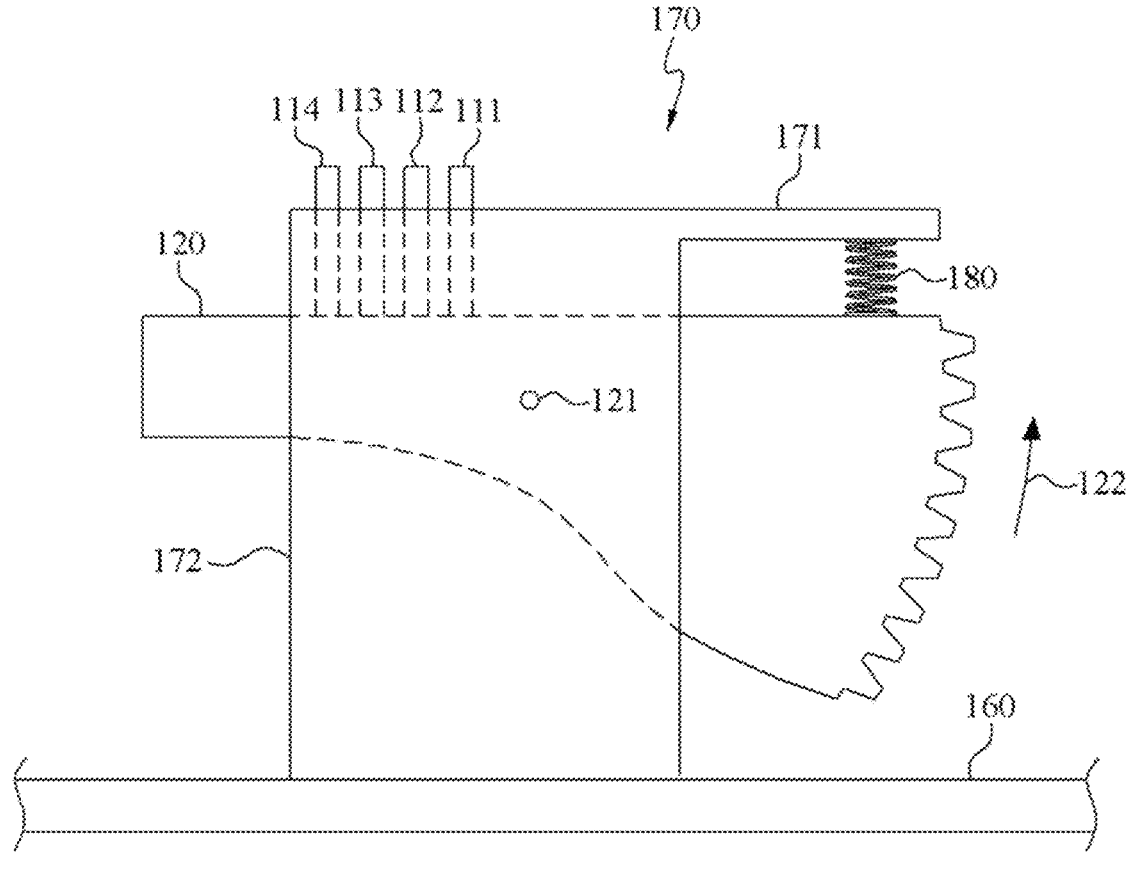
FIG. 2 is a diagram for describing an external force transmitter according to one embodiment of the present disclosure.

Referring to FIG. 1, the energy harvester according to one embodiment of the present disclosure includes an external force transmitter 110, a lever 120, a rotational movement part 130, a magnet portion 140, a coil portion 150, and an elastic body 180 shown in FIG. 2 and, in some embodiments, may further include a support 170 shown in FIG. 2, a housing 160, and a plate (not illustrated in FIG. 1).

The external force transmitter 110 transmits an external force to the lever 120. The external force may be applied to a substrate of the housing 160 in a vertical direction, and the external force transmitter 110 moves toward the lever 120 by the external force to rotate the lever 120 in a first direction around a rotation shaft 121 of the lever 120. In this case, the external force transmitter 110 transmits the external force to different points of the lever 120 according to a magnitude of the external force. That is, according to the magnitude of the external force, a point of force of the lever 120 to which the external force is applied is changed. As an example, as the external force increases, the external force transmitter 110 transmits the external force to a point close to the rotation shaft 121 of the lever 120, and as the external force decreases, the external force transmitter 110 transmits the external force to a point farther from the rotation shaft 121 of the lever 120.

According to the principle of the lever, when a force is applied to a point close to the rotation shaft 121 of the lever 120, the magnitude of the force for rotating the lever 120 should be increased, but a movement displacement of the point of action may be greater than a movement displacement of the point of force. On the other hand, when a force is applied to a point far from the rotation shaft 121 of the lever 120, the magnitude of the force for rotating the lever 120 may be relatively small, but the movement displacement of the point of action may be smaller than the movement displacement of the point of force.

As described below, in the energy harvester according to one embodiment of the present disclosure, as a rotational displacement of the lever 120 increases, a rotational displacement of the magnet portion 140 or the coil portion 150 also increases, and thus an amount of power generation is increased. In these conditions, when a relatively large external force is applied as in the case in which a pedestrian is an adult, it is advantageous to apply the external force to a point close to the rotation shaft 121 of the lever 120 in terms of power generation efficiency. On the other hand, when a relatively small external force is applied as in the case in which the pedestrian is a child, and when the external force is applied to a point close to the rotation shaft 121 of the lever 120, since the lever may not be rotated, it is advantageous to apply the external force to a point far from the rotation shaft 121 of the lever 120 in terms of securing stable power generation.

The external force transmitter 110 may transmit the external force to different points of the lever 120 according to the magnitude of the external force to provide high power generation efficiency and, simultaneously, secure stable power generation in an environment where an external force with various magnitudes is applied.

In some embodiments, a plate may be placed above the external force transmitter 110, and the external force transmitter 110 may be moved toward the lever 120 by an external force applied to the plate.

The lever 120 rotates the rotational movement part 130. The lever 120 is rotated in the first direction by the external force transmitted by the external force transmitter 110, and the rotational movement part 130 may be rotated by a force with which the lever 120 rotates in the first direction. The rotation shaft 121 of the lever 120 may be coupled to the support.

Teeth may be formed on one end which is a point of action of the lever 120, and the teeth may be engaged with a gear included in the rotational movement part 130. When the lever 120 rotates in the first direction, the gear engaged with the teeth rotates in a second direction that is an opposite direction, and thus the rotational movement part 130 may rotate.

The rotational movement part 130 rotates the magnet portion 140 or the coil portion 150. The rotational movement part 130 is rotated by the lever 120, and this rotational force rotates the magnet portion 140 or the coil portion 150. The rotational movement part 130 may include a plurality of gears.

The magnet portion 140 includes a plurality of magnets, and as an example, the magnet portion 140 may be a cylindrical rotor. A magnet may be disposed on an outer circumferential surface of the rotor.

The coil portion 150 includes a coil and is disposed around the magnet portion 140. As an example, the coil portion 150 has a cylindrical shape, and a cylindrical cavity may be formed in the coil portion 150 to allow the rotor to be inserted into the coil portion 150. In other words, the coil portion 150 may have a shape like an inverted cup. The rotor is inserted into an inside of the cup, that is, into the cavity, and the coil may be disposed in the coil portion 150 to allow the magnet of the rotor and the coil to face each other. A diameter of the cavity may be designed to be greater than a diameter of the rotor to allow the magnet portion 140 or the coil portion 150 to rotate.

The magnet portion 140 or the coil portion 150 may include a gear engaged with the gear of the rotational movement part 130 to rotate according to the rotation of the rotational movement part 130.

The elastic body rotates the lever 120 in a second direction. The second direction is a direction opposite to the first direction. In a situation in which the external force disappears, the elastic body rotates the lever 120 in the second direction so that, when the external force is applied again, the lever 120 may rotate in the first direction by the external force.

FIG. 2 is a diagram for describing an external force transmitter according to one embodiment of the present disclosure.

As shown in FIG. 2, the rotation shaft 121 of the lever 120 may be coupled to a support 170, and the support 170 may be vertically fixed to the substrate of the housing 160. The support 170 may include a side substrate 172 and an upper substrate 171, and the rotation shaft 121 may be coupled to the side substrate 172. In addition, the elastic body 180 may be disposed between the upper substrate 171 in which through-holes are formed and the lever 120.

The external force transmitter 110 includes one or more pushing rods 111 to 114 disposed to be spaced at different distances from the rotation shaft 121. In addition, the pushing rods 111 to 114 are disposed in a state of passing through the through-holes of the upper substrate 171 and are moved toward the lever by an external force. FIG. 2 shows an example in which four pushing rods are used, and the number and positions of the pushing rods may be determined in various ways depending on the embodiment.

Since the fourth pushing rod 114 is positioned furthest from the rotation shaft 121, the fourth pushing rod 114 may press the lever 120 even with a relatively weak external force to rotate the lever 120, and since the first pushing rod 111 is closest to the rotation shaft 121, the first pushing rod 111 may press the lever 120 with a relatively strong external force to rotate the lever 120 in a first direction 122. That is, as the external force increases, the lever 120 may be pressed in the order from the fourth pushing rod 114 to the first pushing rod 111 to rotate the lever 120, and as the number of pushing rods pressing the lever 120 increases, the rotational displacement of the lever 120 also increases. In addition, as the rotational displacement of the lever increases, the amount of power generation increases.

In addition, as described above, teeth are formed on one end of the lever 120, and the teeth may be engaged with the gear included in the rotational movement part 130. One end of the lever 120 has a curved shape, and thus a circular gear engaged with the teeth may rotate in a direction opposite to the rotation direction of the lever 120 without separation between the teeth and the gear.

Figure 3:
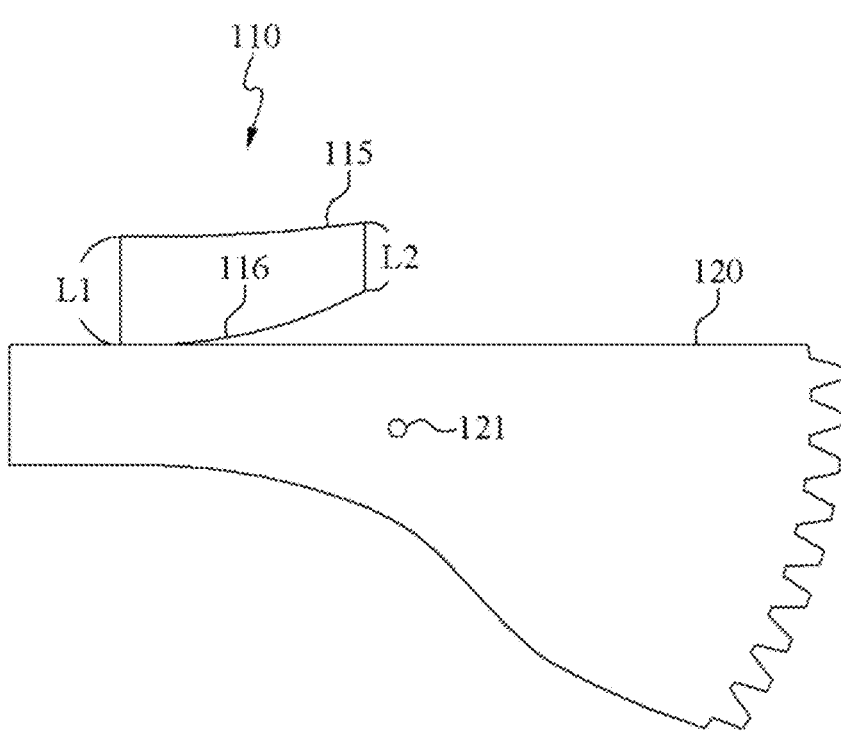
FIG. 3 is a diagram for describing an external force transmitter according to another embodiment of the present disclosure.

FIG. 3 is a diagram for describing an external force transmitter according to another embodiment of the present disclosure.

As shown in FIG. 3, an external force transmitter 110 may be formed of one plate rather than a plurality of separate pushing rods. The plate-shaped external force transmitter 110 is also disposed to pass through a through-hole of an upper substrate 171 and moved toward the lever by an external force.

The external force transmitter 110 may include an upper surface 115 to which an external force is applied, and a lower surface 116 which faces the lever 120 and is in contact with the lever 120. The lower surface 116 may have a curved shape in which a distance between the upper surface 115 and the lower surface 116 decreases from one end to the other end, which is closer to the rotation shaft 121 than the one end. That is, a distance L1 between the upper surface and the lower surface at one end of the external force transmitter is longer than a distance L2 between the upper surface and the lower surface at the other end of the external force transmitter.

Therefore, even when the external force is relatively weak, since a contact position between the lower surface 116 and the lever 120 is relatively far from the rotation shaft 121, the lever 120 may rotate. When the external force increases and a distance that the external force transmitter 110 moves toward the lever increases, the contact position between the lower surface 116 and the lever 120 moves closer to the rotation shaft 121, and the rotational displacement of the lever 120 may increase.

Figure 4:
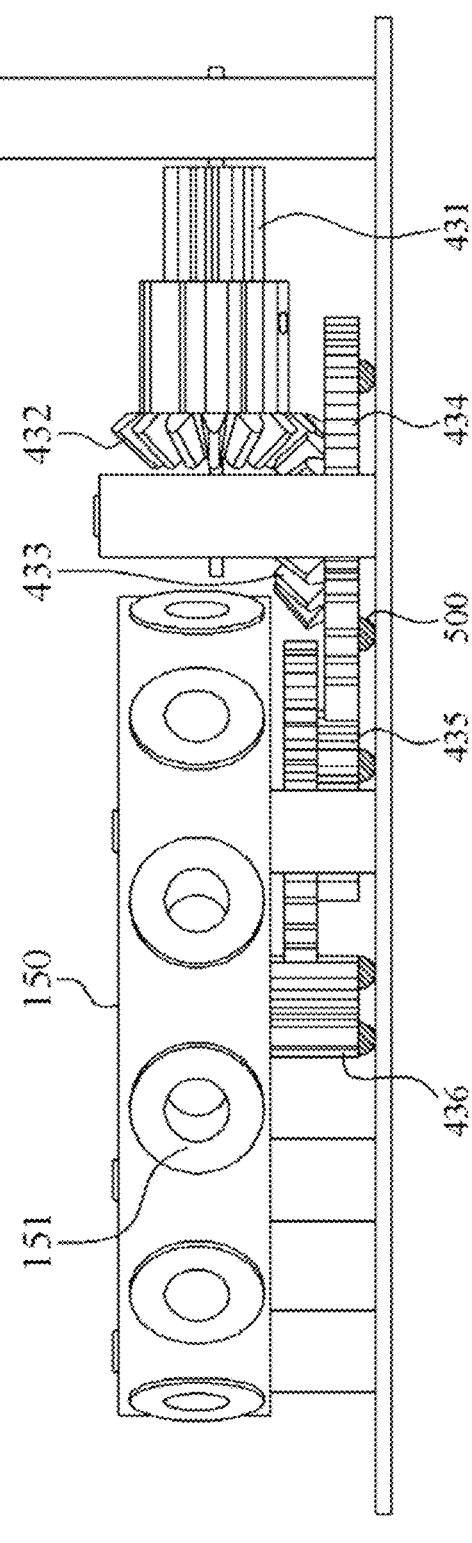
FIG. 4 is a diagram for describing a rotational movement part according to one embodiment of the present disclosure.

FIG. 4 is a diagram for describing a rotational movement part according to one embodiment of the present disclosure.

As shown in FIG. 1 and FIG. 4, the rotational movement part 130 rotates according to the rotation of the lever and includes a plurality of gears for rotating the magnet portion or coil portion. The rotational movement part 130 includes a pinion gear 431, bevel gears 432 and 433, a compound gear 435, and spur gears 434 and 436.

The pinion gear 431, which is engaged with the teeth of the lever 120, is rotated in a direction opposite to the rotation direction of the lever 120, and as the pinion gear 431 rotates, the bevel gears 432 and 433 rotate. As the bevel gear 433 rotates, the spur gear 434 engaged with the bevel gear 433 rotates, and as the spur gear 434 rotates, the compound gear 435 engaged with two spur gears rotates. In addition, as the compound gear 435 rotates, the spur gear 436 engaged with the magnet portion 140 rotates, and thus the magnet portion 140 may rotate.

Meanwhile, as the gear of the rotational movement part 130 rotates, friction occurs between the substrate of the housing 160 and the gear, for example, between the substrate of the housing 160, the spur gears 434 and 436, and the compound gear 435, and this friction reduces harvesting efficiency. In addition, the friction may occur not only between the substrate of the housing 160 and the gear, but also between the magnet portion 140 and the coil portion 150 in which the coils 151 are disposed.

In addition, according to one example of the present disclosure, ball bearings 500 are used to reduce the friction between the gear and the substrate of the housing 160 or between the magnet portion 140 and the coil portion 150. The ball bearing 500 may be inserted into one of the substrate 160 and the gear of the rotational movement part 130 or one of the magnet portion 140 and the coil portion 150. FIG. 4 shows one example of the ball bearing 500 inserted into the gear.

Figure 5A:
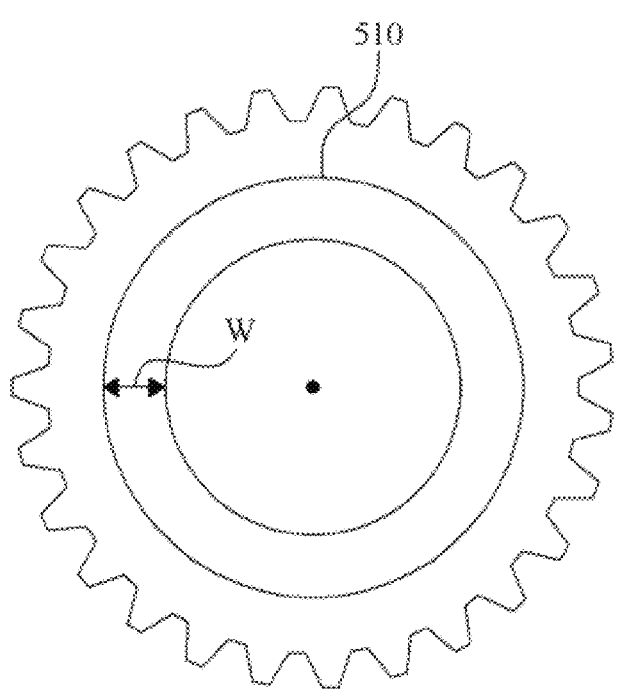
FIGS. 5A and 5B are a diagram illustrating one surface of a gear into which a ball bearing is inserted according to one embodiment of the present disclosure.
Figure 5B:
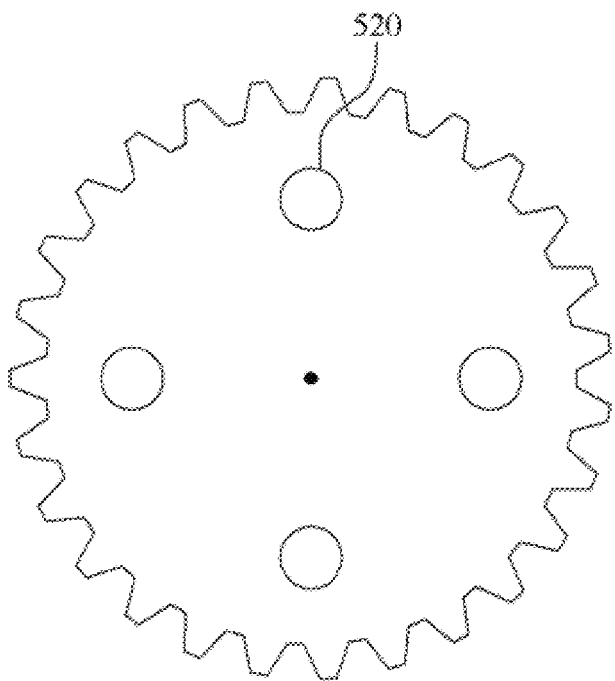

FIGS. 5A and 5B are a diagram illustrating one surface of a gear into which a ball bearing is inserted according to one embodiment of the present disclosure.

The gear into which the ball bearing 500 is inserted is a gear of which one surface on which no teeth are formed faces the substrate of the housing 160 and may be the spur gears 434 and 436 and the compound gear 435 in FIG. 4.

The one surface of the gear facing the substrate of the housing 160 may include a ring-shaped insertion groove 510 shown in FIG. 5A or a circular-shaped insertion groove 520 shown in FIG. 5B, and the ball bearings 500 are inserted into the insertion grooves 510 and 520.

The ball bearing 500 is made of an elastic material such as reinforced plastic, and a width w of an opening of the ring-shaped insertion groove 510 or a diameter of an opening of the circular-shaped insertion groove 520 is smaller than a diameter of the ball bearing 500. Therefore, the ball bearings 500 may be inserted into the insertion grooves 510 and 520, but after being inserted into the insertion grooves 510 and 520, the ball bearings 500 cannot come out of the insertion grooves 510 and 520.

In some examples, the insertion grooves may be formed in the substrate of the housing 160 facing the gear, and the insertion grooves may be formed in the magnet portion 140 or the coil portion 150.

Figure 6:
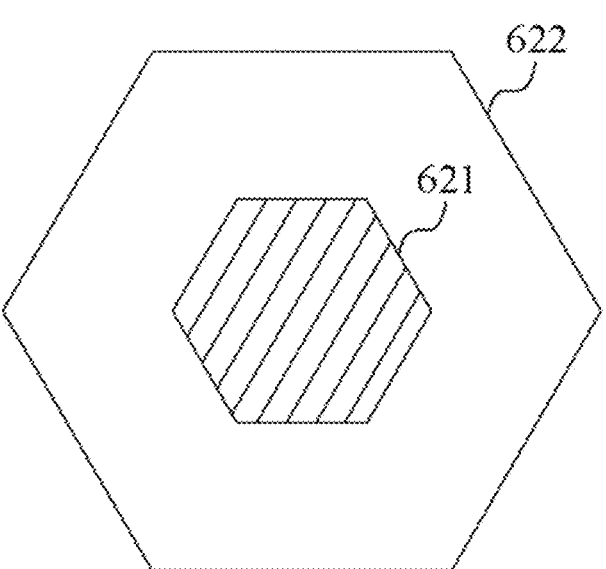
FIGS. 6 to 8 are diagrams for describing an energy harvesting block using electromagnetic induction according to one embodiment of the present disclosure.
Figure 7:
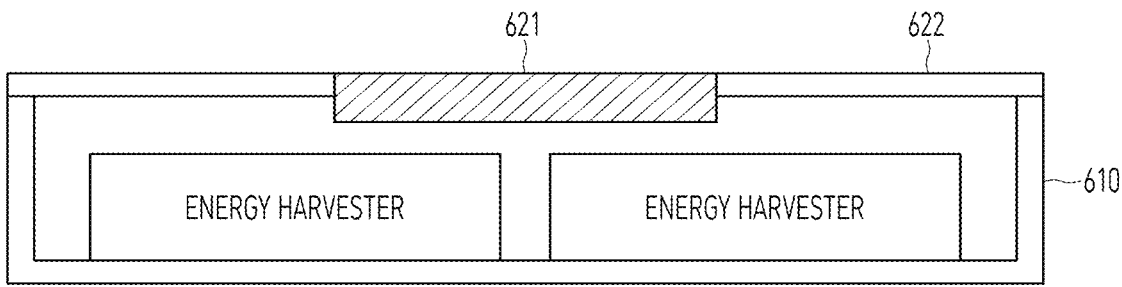
Figure 8:
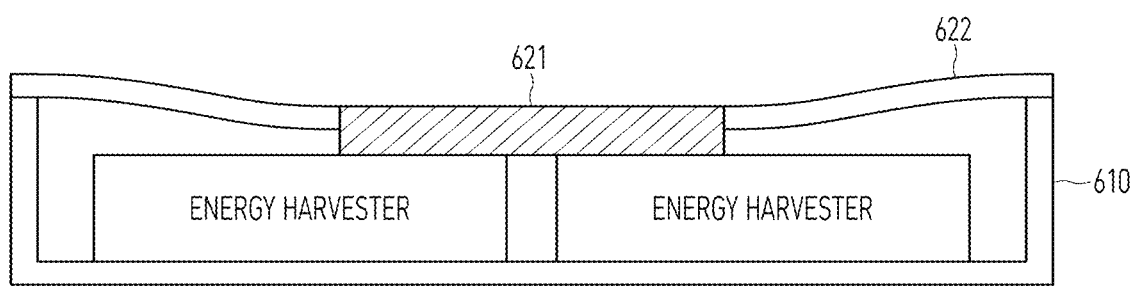

FIGS. 6 to 8 are diagrams for describing an energy harvesting block using electromagnetic induction according to one embodiment of the present disclosure, FIG. 6 shows a plan view of an energy harvesting block, and FIGS. 7 and 8 show cross-sectional views of the energy harvesting block. In addition, FIG. 8 shows an upper cover which is elongated.

Referring to FIGS. 6 to 8, the energy harvesting block according to one embodiment of the present disclosure includes at least one energy harvester, a housing 610, and the upper cover.

The energy harvester is disposed inside the housing 610 with an open upper portion, and the energy harvester is an energy harvester using electromagnetic induction and may be the energy harvester described in FIGS. 1 to 5 or an energy harvester not using the pushing rods or the ball bearings. As an example, the housing 610 may have a hexagonal shape.

The upper cover is coupled to the upper portion of the housing 610 to seal the housing 610. The housing 610 is sealed so that damage to the energy harvester due to moisture or foreign materials can be prevented. In addition, in order to transmit an external force to the energy harvester in a state in which the housing 610 is sealed, the upper cover may be elongated in an inner direction of the housing 610 by the external force as shown in FIG. 8. In addition, in order to allow the upper cover to be elongated in the inner direction of the housing 610, the upper cover may be made of an elastic material. As the external force transmitter of the energy harvester is moved toward the lever by the elongation of the upper cover, the lever rotates in the first direction around the rotation axis of the lever.

The upper cover includes a central substrate 621 disposed in the center of the upper cover and an elastic substrate 622 made of a transparent elastic body. The elastic substrate 622 may be made of an elastic reinforced plastic material, and the central substrate 621 may also be made of an elastic reinforced plastic material or a metal material. The energy harvester may be disposed inside the housing 610 to place the external force transmitter of the energy harvester below the central substrate 621. In addition, in order to encourage pedestrians to step on the central substrate 621, an image of a shoe may be displayed on the central substrate 621.

The central substrate 621 may be coupled to a lower surface of the elastic substrate 622 or, as shown in FIG. 7, the elastic substrate 622 may be coupled to a side surface of the central substrate 621. In this case, a height of the central substrate 621 may be higher than a height of the elastic substrate 622. In other words, a separation distance between the central substrate 621 and the energy harvester may be smaller than a separation distance between the elastic substrate 622 and the energy harvester. Thus, even when a movement displacement of the central substrate 621 is not large, the central substrate 621 may easily reach the external force transmitter by an external force.

A light-emitting element may be disposed below the elastic substrate 622, and the light-emitting element may emit light using the energy generated by the energy harvester. The light emitted from the light-emitting element may pass through the transparent elastic substrate 622, and pedestrians may visually check that energy harvesting occurs by their own walking.

According to the present disclosure, harvesting efficiency can be increased by rotating a coil portion in a direction opposite to a rotation direction of a magnet portion.

In addition, according to the present disclosure, the harvesting efficiency can be increased by maximizing a rotation amount of the magnet portion or coil portion according to use environments in which external forces are different.

While the present disclosure has been described with reference to specific items such as specific components, exemplary embodiments, and the accompanying drawings, these are merely provided to aid in understanding the present disclosure, and the present disclosure is not limited to these embodiments, and those skilled in the art to which the present disclosure pertains can make various modifications and variations from the description of the present disclosure. Therefore, the spirit of the present disclosure should not be limited to the above-described embodiments, and all equivalents or equivalent modifications of the appended claims will be considered to fall within the scope of the present disclosure.

What is claimed is:

1. An energy harvester using electromagnetic induction, comprising:
   a magnet portion;
   a coil portion including a coil and disposed around the magnet portion;
   a rotational movement part configured to rotate the magnet portion or the coil portion;
   a lever configured to rotate the rotational movement part;
   an external force transmitter that is moved toward the lever by an external force to rotate the lever in a first direction about a rotation shaft of the lever and transmits the external force to different points of the lever according to a magnitude of the external force; and
   an elastic body configured to rotate the lever in a second direction.

2. The energy harvester of claim 1, wherein the external force transmitter transmits the external force to a point closer to the rotation shaft as the external force increases.

3. The energy harvester of claim 2, wherein the external force transmitter includes one or more pushing rods disposed to be spaced at different distances from the rotation shaft.

4. The energy harvester of claim 3, further comprising a support coupled to the rotation shaft and including a plurality of through-holes through which the pushing rods pass.

5. The energy harvester of claim 4, wherein the support includes:
   a side substrate to which the rotation shaft is coupled; and
   an upper substrate in which the through-holes are formed,
   wherein the elastic body is disposed between the upper substrate and the lever.

6. The energy harvester of claim 2, wherein the external force transmitter includes:
   an upper surface to which the external force is applied; and
   a lower surface having a curved shape in contact with the lever,
   wherein a distance between the upper surface and the lower surface decreases from one end to the other end which is closer to the rotation shaft than the one end.

7. The energy harvester of claim 1, wherein teeth formed at one end which is a point of action of the lever are engaged with a gear included in the rotational movement part.

8. An energy harvester using electromagnetic induction, comprising:
   a substrate;
   a magnet portion;
   a coil portion including a coil and disposed around the magnet portion;
   a rotational movement part configured to rotate the magnet portion or the coil portion on the substrate and including at least one gear;
   a lever configured to rotate the rotational movement part;
   an external force transmitter that is moved toward of the lever by an external force to rotate the lever in the first direction around the rotation shaft of the lever;
   an elastic body configured to rotate the lever in a second direction; and a ball bearing configured to reduce friction between the gear and the substrate or between the magnet portion and the coil portion.

9. The energy harvester of claim 8, wherein the ball bearing is inserted into one of the substrate and the gear or one of the magnet portion and the coil portion.

10. The energy harvester of claim 9, wherein one surface of the gear facing the substrate includes a ring-shaped or circular-shaped insertion groove into which the ball bearing is inserted.

11. The energy harvester of claim 10, wherein:
the ball bearing is made of an elastic material; and
a width of an opening of the ring-shaped insertion groove or a diameter of an opening of the circular-shaped insertion groove is smaller than a diameter of the ball bearing.

12. An energy harvesting block using electromagnetic induction, comprising:
at least one energy harvester;
a housing in which the energy harvester is disposed and of which an upper portion is open; and
an upper cover coupled to the upper portion of the housing to seal the housing and elongated in an inner direction of the housing by an external force,
wherein an energy harvester includes:
a magnet portion;
a coil portion including a coil and disposed around the magnet portion;

a rotational movement part configured to rotate the magnet portion or the coil portion;
a lever configured to rotate the rotational movement part;
an external force transmitter that is moved toward the lever by the elongation of the upper cover to rotate the lever in the first direction around the rotation shaft of the lever; and
an elastic body configured to rotate the lever in a second direction.

13. The energy harvesting block of claim 12, wherein the upper cover includes:
a central substrate disposed at a center of the upper cover; and
an elastic substrate made of a transparent elastic body,
wherein the external force transmitter is located below the central substrate.

14. The energy harvesting block of claim 13, wherein the central substrate is coupled to a lower surface of the elastic substrate.

15. The energy harvesting block of claim 13, wherein:
the elastic substrate is coupled to a side surface of the central substrate; and
a separation distance between the central substrate and the energy harvester is smaller than a separation distance between the elastic substrate and the energy harvester.

16. The energy harvesting block of claim 13, further comprising a light-emitting element disposed below the elastic substrate.

* * * * *